US012470969B2

(12) United States Patent
Liu et al.

(10) Patent No.: US 12,470,969 B2
(45) Date of Patent: Nov. 11, 2025

(54) TIMER FOR QUALITY OF EXPERIENCE MEASUREMENTS

(71) Applicant: QUALCOMM Incorporated, San Diego, CA (US)

(72) Inventors: Jianhua Liu, Beijing (CN); Xipeng Zhu, San Diego, CA (US); Shankar Krishnan, San Diego, CA (US); Rajeev Kumar, San Diego, CA (US); Charles Nung Lo, San Diego, CA (US); Juan Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 239 days.

(21) Appl. No.: 18/260,733

(22) PCT Filed: Apr. 1, 2021

(86) PCT No.: PCT/CN2021/084848
§ 371 (c)(1),
(2) Date: Jul. 7, 2023

(87) PCT Pub. No.: WO2022/205278
PCT Pub. Date: Oct. 6, 2022

(65) Prior Publication Data

US 2024/0064550 A1 Feb. 22, 2024

(51) Int. Cl.
*H04W 24/10* (2009.01)
*H04L 41/5067* (2022.01)
*H04W 80/12* (2009.01)

(52) U.S. Cl.
CPC ......... *H04W 24/10* (2013.01); *H04L 41/5067* (2013.01); *H04W 80/12* (2013.01)

(58) Field of Classification Search
CPC .................................................... H04W 24/10
USPC ........................................................ 370/329
See application file for complete search history.

(56) References Cited

U.S. PATENT DOCUMENTS

| | | | |
|---|---|---|---|
| 2015/0010208 | A1 | 1/2015 | Phan et al. |
| 2018/0041958 | A1 | 2/2018 | Narayanan et al. |
| 2020/0153712 | A1 | 5/2020 | Miao et al. |

FOREIGN PATENT DOCUMENTS

| | | | |
|---|---|---|---|
| CN | 102124717 | A | 7/2011 |
| WO | WO-2011158221 | A2 | 12/2011 |
| WO | 2012134465 | A1 | 10/2012 |
| WO | WO-2013133841 | A1 | 9/2013 |
| WO | WO-2019019007 | A1 | 1/2019 |
| WO | 2020222199 | A1 | 11/2020 |
| WO | 2022150005 | A1 | 7/2022 |

OTHER PUBLICATIONS

Huawei: "RAN3 Impacts of QMC for Streaming Services," 3GPP TSG-RAN3 Meeting #94, R3-162916, Reno, Nevada, USA, Nov. 14-18, 2016, (Nov. 18, 2016), pp. 1-8, the whole document.

(Continued)

*Primary Examiner* — Angel T Brockman
(74) *Attorney, Agent, or Firm* — Harrity & Harrity, LLP

(57) ABSTRACT

Various aspects of the present disclosure generally relate to wireless communication. In some aspects, a user equipment (UE) may start a timer for obtaining quality of experience (QoE) measurements. The UE may obtain the QoE measurements until the timer expires. The UE may transmit information indicating the QoE measurements. Numerous other aspects are described.

32 Claims, 8 Drawing Sheets

(56) References Cited

OTHER PUBLICATIONS

International Search Report and Written Opinion—PCT/CN2021/084848—ISA/EPO—Jan. 4, 2022.

Supplementary European Search Report—EP21933938—Search Authority—Munich—Nov. 13, 2024.

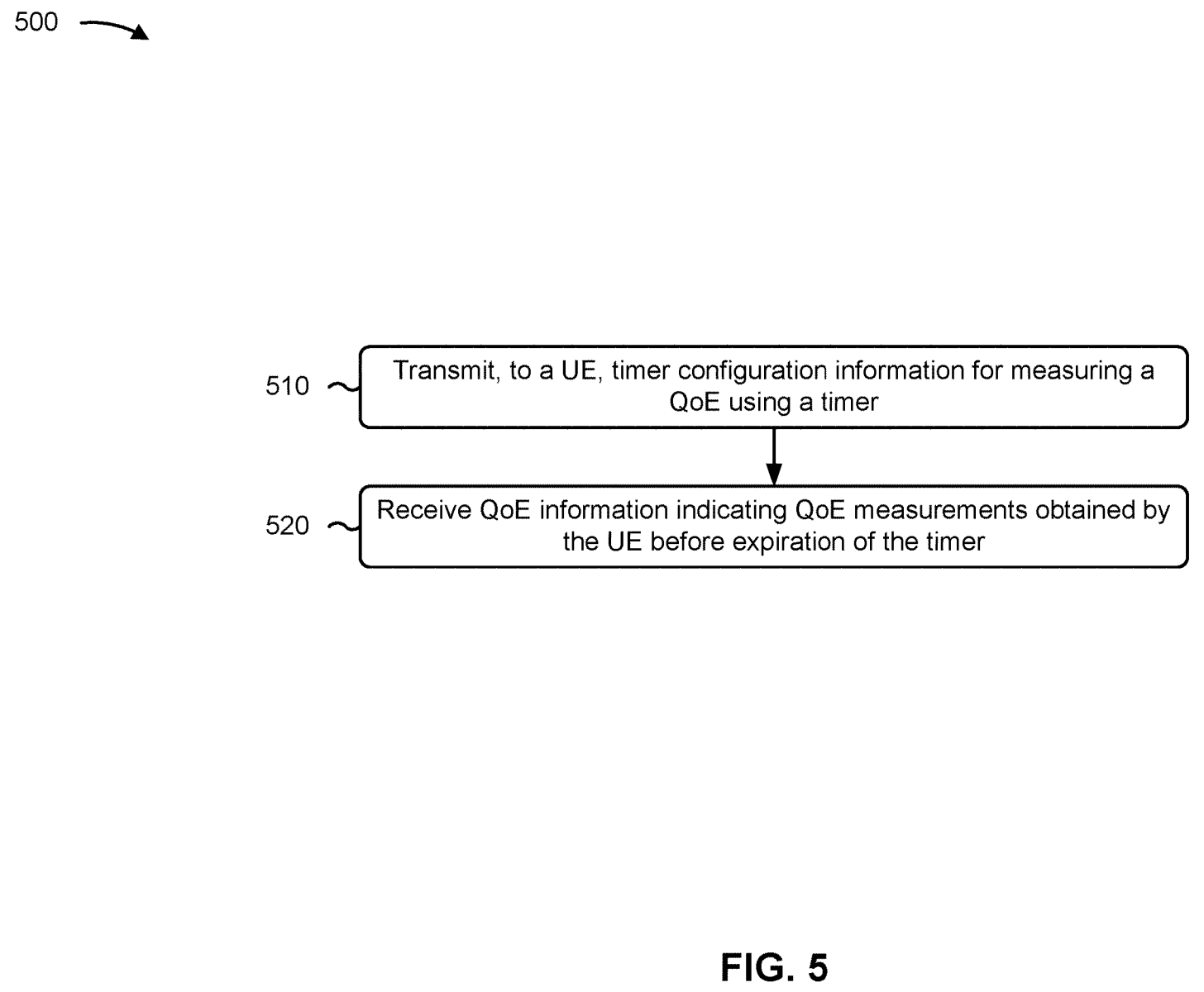

500

510 Transmit, to a UE, timer configuration information for measuring a QoE using a timer 520 Receive QoE information indicating QoE measurements obtained by the UE before expiration of the timer

FIG. 5

TIMER FOR QUALITY OF EXPERIENCE MEASUREMENTS

CROSS-REFERENCE TO RELATED APPLICATION

This Patent Application is a 371 national stage of PCT Application No. PCT/CN2021/084848 filed on Apr. 1, 2021, entitled "TIMER FOR QUALITY OF EXPERIENCE MEASUREMENTS," and assigned to the assignee hereof. The disclosure of the prior Application is considered part of and is incorporated by reference into this Patent Application in its entirety.

FIELD OF THE DISCLOSURE

Aspects of the present disclosure generally relate to wireless communication and to techniques and apparatuses for using a timer for quality of experience measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes starting a timer for obtaining quality of experience (QoE) measurements, obtaining the QoE measurements until the timer expires, and transmitting information indicating the QoE measurements.

In some aspects, a method of wireless communication performed by a base station includes transmitting, to a UE, timer configuration information for measuring a quality of experience (QoE) using a timer, and receiving QoE information indicating QoE measurements obtained by the UE before expiration of the timer.

In some aspects, a UE for wireless communication includes a memory and one or more processors, coupled to the memory, configured to start a timer for obtaining QoE measurements, obtain the QoE measurements until the timer expires, and transmit information indicating the QoE measurements.

In some aspects, a base station for wireless communication includes a memory and one or more processors, coupled to the memory, configured to transmit, to a UE, timer configuration information for measuring a QoE using a timer, and receive QoE information indicating QoE measurements obtained by the UE before expiration of the timer.

In some aspects, a non-transitory computer-readable medium storing a set of instructions for wireless communication includes one or more instructions that, when executed by one or more processors of a UE, cause the UE to start a timer for obtaining QoE measurements, obtain the QoE measurements until the timer expires, and transmit information indicating the QoE measurements.

In some aspects, a non-transitory computer-readable medium storing a set of instructions for wireless communication includes one or more instructions that, when executed by one or more processors of a base station, cause the base station to transmit, to a UE, timer configuration information for measuring a QoE using a timer, and receive QoE information indicating QoE measurements obtained by the UE before expiration of the timer.

In some aspects, an apparatus for wireless communication includes means for starting a timer for obtaining QoE measurements, means for obtaining the QoE measurements until the timer expires, and means for transmitting information indicating the QoE measurements.

In some aspects, an apparatus for wireless communication includes means for transmitting, to a UE, timer configuration information for measuring a QoE using a timer, and means for receiving QoE information indicating QoE measurements obtained by the UE before expiration of the timer.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a base station, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
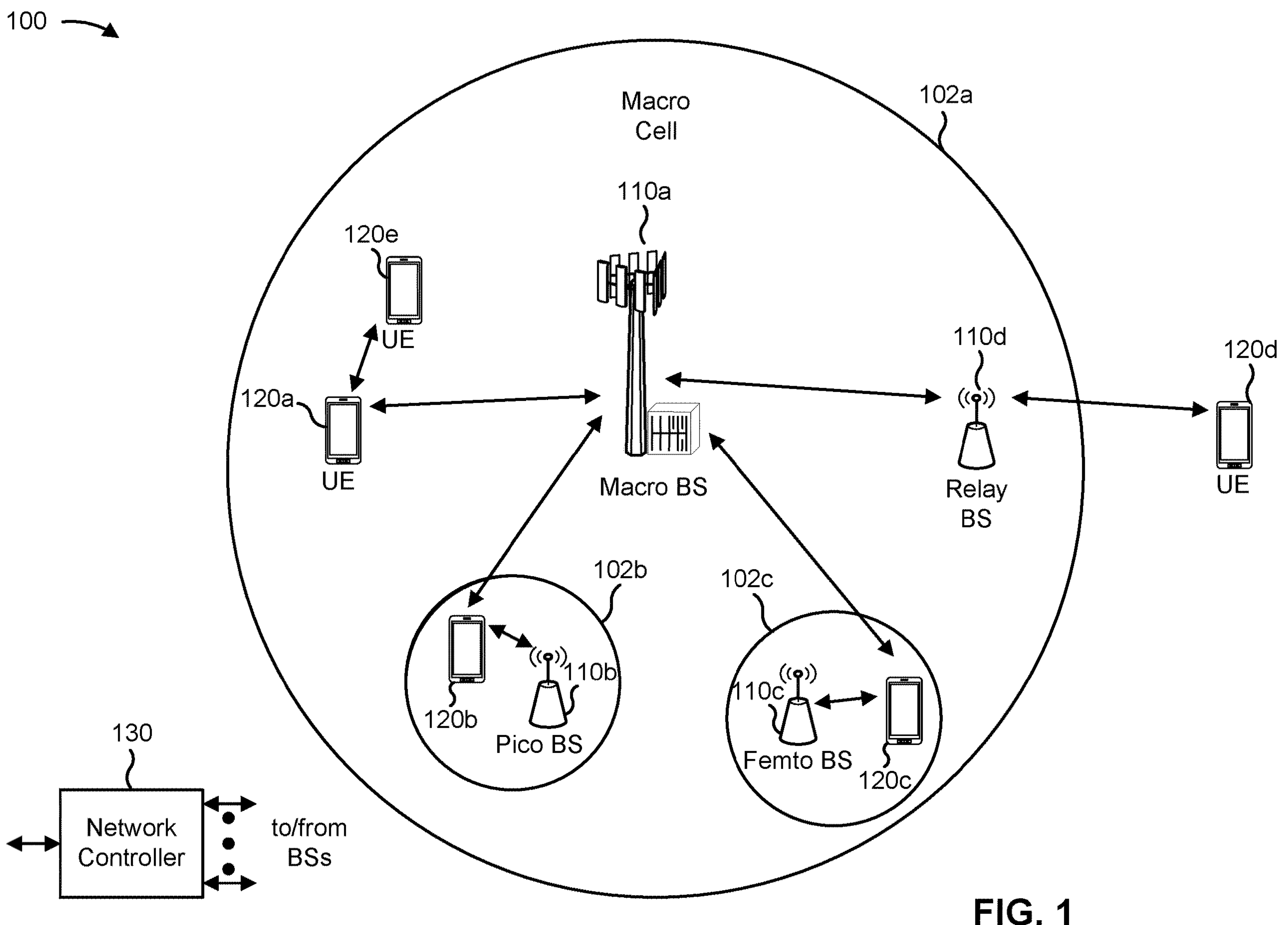
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms “eNB”, “base station”, “NR BS”, “gNB”, “TRP”, “AP”, “node B”, “5G NB”, and “cell” may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a “sub-6 GHz” band. Similarly, FR2 is often referred to as a “millimeter wave” band despite being different from the extremely high frequency (EHF) band (30 GHz-300 GHz) which is identified by the International Telecommunications Union (ITU) as a “millimeter wave” band. Thus, unless specifically stated otherwise, it should be understood that the term “sub-6 GHz” or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term “millimeter wave” or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
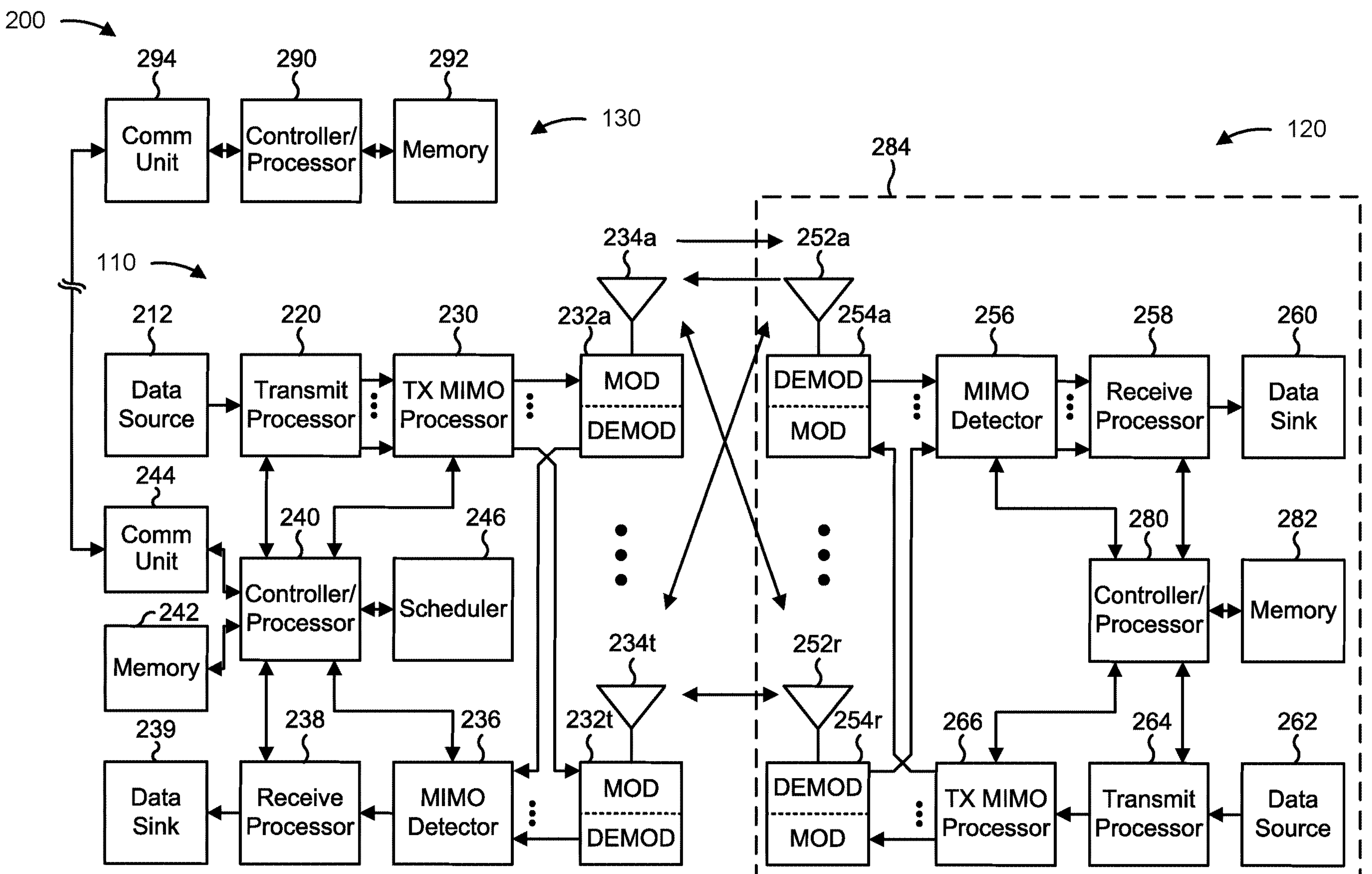
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-7).

Controller/processor 240 of base station 110, controller/processor 280 of UE 120, and/or any other component(s) of FIG. 2 may perform one or more techniques associated with using a timer for quality of experience (QoE) measurements, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, the UE 120 includes means for starting a timer for obtaining QoE measurements, means for obtaining the QoE measurements until the timer expires, and/or means for transmitting information indicating the QoE measurements. The means for the UE 120*d* to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for transmitting, to a UE 120, timer configuration information for measuring a QoE using a timer, and/or means for receiving QoE information indicating QoE measurements obtained by the UE before expiration of the timer. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
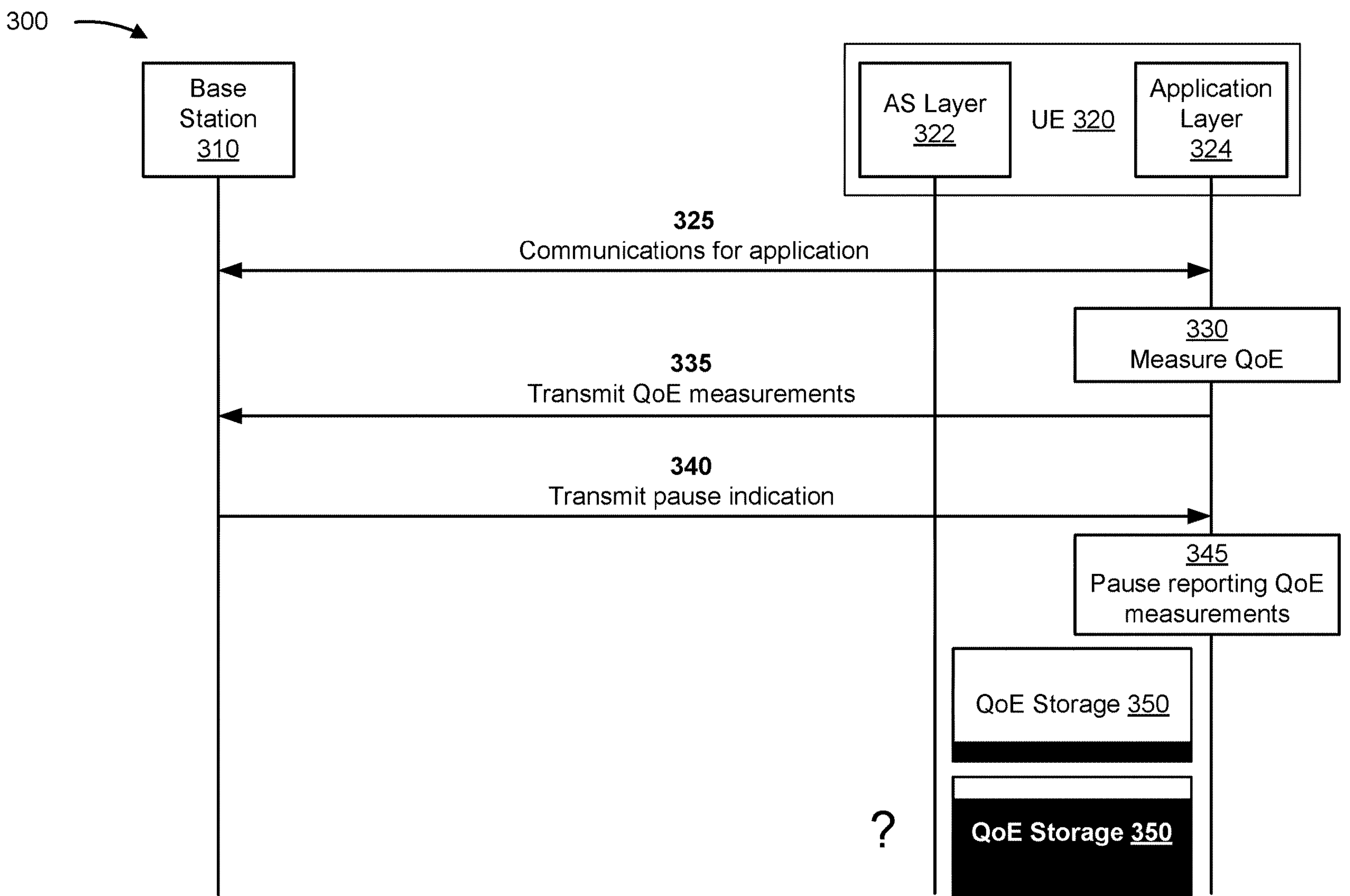
FIGS. 3A-3B is a diagram illustrating an example of using a timer for QoE measurements, in accordance with the present disclosure.
Figure 3B:
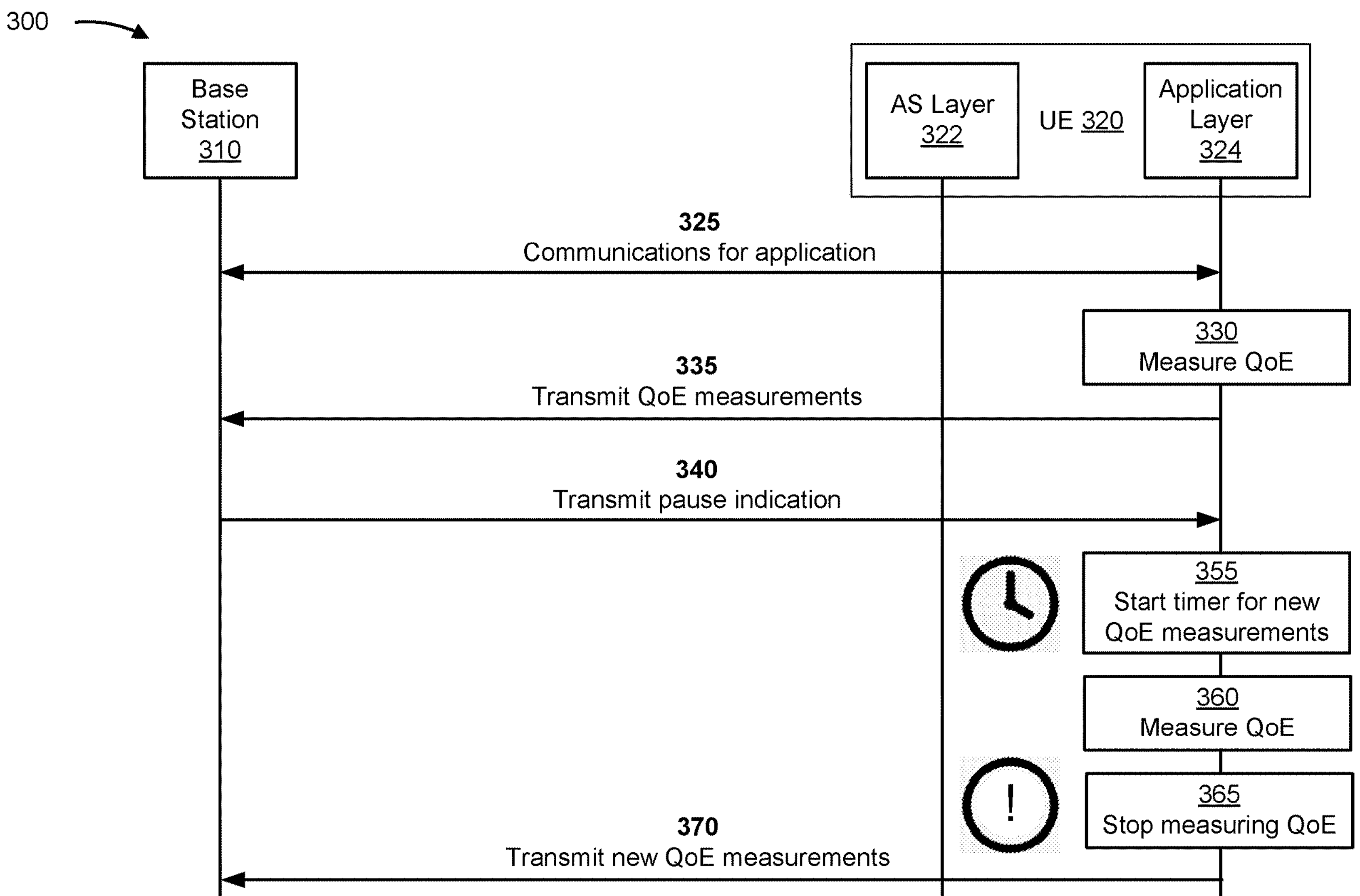

FIGS. 3A-3B are diagrams illustrating an example 300 of using a timer for QoE measurements, in accordance with the present disclosure. As shown in FIG. 3A, a base station 310 (e.g., base station 110) may communicate with a UE 320 (e.g., UE 120). The base station 310 and the UE 320 may be part of a wireless network (e.g., wireless network 100). The UE may operate with different layers that involve different functions. For example, the UE may operate with an access stratum (AS) layer 322 that handles commands and data flows between a physical layer and an application layer 324. The application layer 324 may control operations for an application, such as a video streaming application.

As shown by reference number 325, there may be communications for the application between the base station 310 and the UE 320. For example, the base station 310 may transmit data as part of a video stream to the UE 320. The UE 320 may receive the data at the AS layer 322 and provide the data to the application layer 324. The application layer 324 may control display of the video stream to a user. The user may provide information controlling the video stream, and the application layer 324 may process that information and provide the information to the AS layer 322. The AS layer 322 may transmit that information to the base station 310.

If the user is able to view the video stream without issue, the user may perceive the quality of experience (QoE) of the application, or overall acceptability of the application, to be good. If there are issues with the video stream (e.g., delays, degraded quality, long pauses), the QoE perceived by the user may be poor. The user may indicate satisfaction or dissatisfaction to the application as an indicator of the QoE. The UE 320 may obtain QoE measurements by receiving such QoE information from the application or from the base station 310. While the QoE information may be subjective and depend on expectations of the user, there may be more objective indicators (e.g., data rate, buffering time, delay time, video definition) that may be used to measure a QoE. Examples of QoE measurements that correspond to such indicators include a corruption duration metric, a successive loss of real-time transport protocol (RTP) packets, a frame rate, a jitter duration, a synchronization loss duration, a round-trip time, an average codec bitrate, codec information, and/or other metrics that reflect what a user could perceive as affecting the QoE. The types of QoE measurements may vary for different service types. As shown by reference number 330, the UE 320 (the application layer 324) may obtain such QoE measurements. The UE 320 may receive a configuration specifying QoE measurements to obtain or specifying other indicators for measuring the QoE. The UE 320 may receive the configuration from the network in a radio resource control (RRC) message.

As shown by reference number 335, the application layer 324 may transmit the QoE measurements via the AS layer 322. The QoE measurements may be sent in one or more QoE reports. The QoE measurements may have a lower priority and the UE 320 may transmit the QoE measurements on a signaling radio bearer (SRB) that is separate from other communications for the application.

As shown by reference number 340, the base station 310 may transmit an indication to pause the reporting of the QoE measurements. The indication may be transmitted in an RRC message. As shown by reference number 345, the UE 320 may pause the reporting of QoE measurements. However, the UE 320 may continue to obtain QoE measurements and store them in a memory of the UE 320, such as in QoE storage 350. While the base station 310 may later transmit an indication to resume the reporting of the QoE measurements, it is not clear when the base station 310 will transmit the indication to resume the reporting. In the meantime, the QoE storage 350 may have a limited storage size but is filling with QoE measurements. If the QoE storage 350 is full, newer QoE measurements may not be stored, resulting in a waste of processing resources. If the newer QoE measurements are not preserved for transmission to the base station 310, when the base station 310 resumes receiving QoE measurement reporting, the QoE measurements that are received by the base station 310 may be outdated. Outdated QoE measurements may lead to inaccurate determinations or adjustments by the base station 310 and/or the UE 320. This may lead to degraded communications and cause the UE 320 to waste processing resources and signaling resources.

According to various aspects described herein, the UE 320 may use a timer for obtaining QoE measurements. The timer may start when a QoE configuration is received or when a start measurement indication is received. In some aspects, the timer may start when a pause indication or a transmission failure indication is received. The timer may also start when a resume measurement indication is received. The timer may also start when a transmission at the AS layer 322 fails or when the UE 320 enters an idle or an inactive state. The timer may be configured with a time duration, and the time duration may be configured per service type, per QoE configuration, and/or per network slice.

When the timer expires, the UE 320 may stop obtaining the QoE measurements. The UE 320 may transmit the QoE measurements or hold the QoE measurements for subsequent reporting (e.g., reported with an indication of an age of the QoE measurements). If the timer runs in the AS layer 322, the AS layer 322 may provide an indication to the application layer 324, when the timer expires, to stop obtaining QoE measurements. As a result, the UE 320 does not overflow the QoE storage 350 and conserves processing resources that would otherwise be wasted on QoE measurements that were not stored. The timer may leave storage space for newer QoE measurements in the QoE storage 350 when QoE measurements resume. More current measurements may lead to better management of processing resources and signaling resources.

FIG. 3B shows the UE 320 using a timer for obtaining QoE measurements. As shown by reference number 355, the UE 320 may start the timer for obtaining QoE measurements. Note that the timer may start at any time before a time corresponding to reference number 325 until after a time corresponding to reference number 340. As shown by reference number 360, the application layer 324 may obtain QoE measurements until the timer expires. As shown by reference number 365, the application layer 324 may stop obtaining QoE measurements after the timer expires. The UE 320 may release the QoE configuration after the timer expires, or there may be a separate release timer for releasing the QoE configuration.

The UE 320 may take steps to manage storage of the QoE measurements. In some aspects, the application layer 324 (or the AS layer 322) may store the QoE measurements that are obtained during a time window. The time window may be a rolling time window that moves while the timer is running (e.g., last hour, last 24 hours). The application layer 324 or the AS layer 322 may discard any QoE measurements that were obtained outside the (latest) time window (e.g., discard older QoE measurements). The time window may be configured per service type, per QoE configuration, and/or per network slice. If the AS layer 322 receives a configuration for the time window, the AS layer 322 may provide the configuration for the time window to the application layer 324. In some aspects, the application layer 324 may store QoE measurements for a defined time duration (e.g. time of day) and/or for a defined location (e.g., at cell's edge).

In some aspects, the application layer 324 or the AS layer 322 may store QoE measurements obtained within a storage size window. For example, a QoE configuration may have a maximum storage size (smaller than a total storage size of the QoE storage 350). The application layer 324 or the AS layer 322 may store QoE measurements up to the maximum storage size, within a range of storage sizes, or within a portion of the QoE storage 350. There may be a threshold size (e.g., 1 byte) for individual QoE measurements. In some aspects, the application layer 324 or the AS layer 322 may store QoE measurements obtained within a storage queue window. For example, the application layer 324 or the AS layer 322 may store QoE measurements up to a specified quantity of QoE measurements that are queued for storage.

In some aspects, the application layer 324 or the AS layer 322 may store QoE measurements up to a storage size threshold. In some aspects, the application layer 324 or the AS layer 322 may overwrite stored QoE measurements (e.g., oldest QoE measurements) if the QoE storage 350 is full or within a threshold of being full. The overwriting may occur according to various conditions. For example, stored QoE measurements may be overwritten based at least in part on a comparison of service type priorities. For example, stored QoE measurements for a gaming application may be overwritten, but stored QoE measurements for a video call application may not be overwritten. QoE measurements for multimedia applications may have priority over QoE measurements for broadcast services. In some aspects, the application layer 324 or the AS layer 322 may overwrite stored QoE measurements based at least in part on comparing priorities of time durations (e.g., work day over Saturday) and/or comparing priorities of locations (e.g., workplace over restaurant). The priorities may be preconfigured in the UE 320 or configured by the base station 310. If there is no priority specified, the UE 320 may not overwrite stored QoE measurements. Alternatively, or additionally, the base station 310 may transmit an indication for overwriting stored QoE measurements. In some aspects, the application layer 324 or the AS layer 322 may overwrite stored QoE measurements for a specific network slice. A higher priority slice QoE measurement may overwrite a lower priority slice QoE measurement. For example, a slice for an ultra-reliable low-latency communication (URLLC) QoE measurement may have a higher priority than a slice for an enhanced mobile broadband (eMBB) QoE measurement. The slice priority may be obtained from stored configuration information (according to a standard), preconfigured at the UE 320, or configured by the network. By selectively overwriting stored QoE measurements with new QoE measurements, the UE 320 may manage the QoE storage 350 so as not to waste processing resources, signaling resources, and storage resources, while reporting more accurate QoE measurements, which may improve the QoE for the user.

As shown by reference number 370, the UE 320 may transmit the QoE measurements to the base station 310. The base station 310 may use the QoE measurements to adjust a configuration for the application. The base station 310 may use the configuration to configure a pause command for the UE to pause QoE measurements for a time if QoE measurements are not currently necessary. The base station 310 may also use the QoE measurements to configure a storage size for the QoE storage 350. In this way, the base station 310 may manage the QoE storage 350 so as not to waste processing resources, signaling resources, and storage resources, while the UE 320 reports more current QoE measurements.

As indicated above, FIGS. 3A-3B provide an example. Other examples may differ from what is described with regard to FIGS. 3A-3B.

Figure 4:
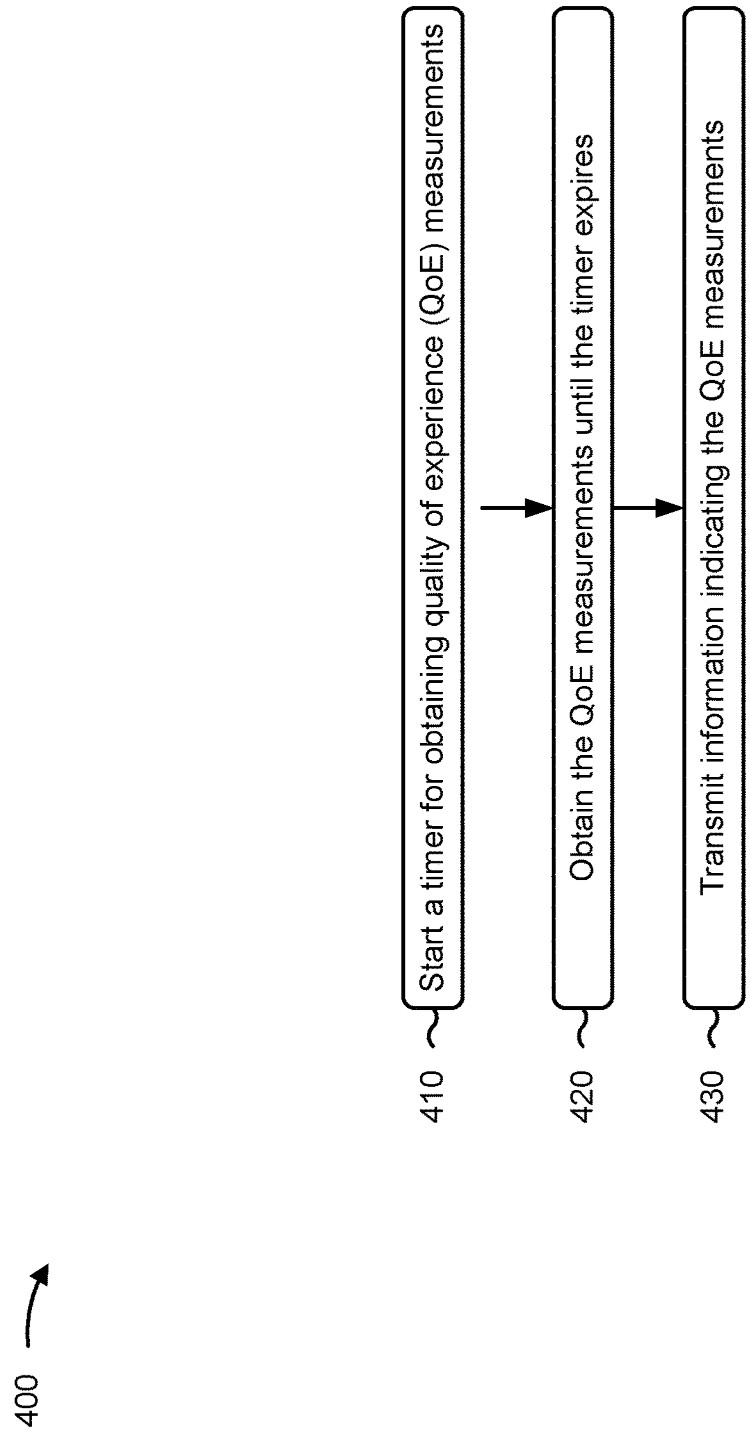
FIG. 4 is a diagram illustrating an example process performed, for example, by a UE, in accordance with the present disclosure.

FIG. 4 is a diagram illustrating an example process 400 performed, for example, by a UE, in accordance with the present disclosure. Example process 400 is an example where the UE (e.g., UE 120, UE 320) performs operations associated with using a timer for QoE measurements.

As shown in FIG. 4, in some aspects, process 400 may include starting a timer for obtaining QoE measurements (block 410). For example, the UE (e.g., using timer component 608 depicted in FIG. 6) may start a timer for obtaining QoE measurements, as described above.

As further shown in FIG. 4, in some aspects, process 400 may include obtaining the QoE measurements until the timer expires (block 420). For example, the UE (e.g., using measurement component 610 depicted in FIG. 6) may obtain the QoE measurements until the timer expires, as described above.

As further shown in FIG. 4, in some aspects, process 400 may include transmitting information indicating the QoE measurements (block 430). For example, the UE (e.g., using transmission component 604 depicted in FIG. 6) may transmit information indicating the QoE measurements, as described above.

Process 400 may include additional aspects, such as any single aspect or any combination of aspects described below and/or in connection with one or more other processes described elsewhere herein.

In a first aspect, the timer runs in an application layer.

In a second aspect, alone or in combination with the first aspect, the timer is started based at least in part on the application layer receiving, from a lower layer, one or more of a pause indication, a transmission failure indication, a QoE configuration, a resume measurement indication, or a start measurement indication.

In a third aspect, alone or in combination with one or more of the first and second aspects, process 400 includes receiving, from an AS layer, timer configuration information to configure the timer per one or more of a service type, a QoE configuration, or a network slice.

In a fourth aspect, alone or in combination with one or more of the first through third aspects, the timer runs in an AS layer.

In a fifth aspect, alone or in combination with one or more of the first through fourth aspects, the timer is started based at least in part on receiving a pause indication, a resume measurement indication, a start measurement indication, or a QoE configuration.

In a sixth aspect, alone or in combination with one or more of the first through fifth aspects, the timer is started based at least in part on a transmission failure at the AS layer or entering an idle or inactive state.

In a seventh aspect, alone or in combination with one or more of the first through sixth aspects, process 400 includes providing, to an application layer, an indication to stop measurements or an indication that the timer expired.

In an eighth aspect, alone or in combination with one or more of the first through seventh aspects, process 400 includes receiving, from a base station, timer configuration information that is configured per one or more of a service type, a QoE configuration, or a network slice.

In a ninth aspect, alone or in combination with one or more of the first through eighth aspects, process 400 includes releasing a QoE configuration after the timer expires.

In a tenth aspect, alone or in combination with one or more of the first through ninth aspects, process 400 includes releasing a QoE configuration after a separate release timer expires.

In an eleventh aspect, alone or in combination with one or more of the first through tenth aspects, process 400 includes storing one or more QoE measurements of the QoE measurements that are obtained within a time window, and discarding any QoE measurements of the QoE measurements that are obtained outside the time window.

In a twelfth aspect, alone or in combination with one or more of the first through eleventh aspects, the time window is configured per one or more of a service type, a QoE configuration, or a network slice.

In a thirteenth aspect, alone or in combination with one or more of the first through twelfth aspects, process 400 includes stopping the obtaining if a storage size of QoE measurements satisfies a storage size threshold.

In a fourteenth aspect, alone or in combination with one or more of the first through thirteenth aspects, process 400 includes storing one or more QoE measurements of the QoE measurements that are obtained within a storage size window or a storage queue window, and discarding any QoE measurements of the QoE measurements that are obtained outside the storage size window or the storage queue window.

In a fifteenth aspect, alone or in combination with one or more of the first through fourteenth aspects, process 400 includes storing one or more QoE measurements of the QoE measurements that are for one or more of a defined time duration or a defined location.

In a sixteenth aspect, alone or in combination with one or more of the first through fifteenth aspects, process 400 includes overwriting stored QoE measurements with the QoE measurements if a QoE measurement storage is full.

In a seventeenth aspect, alone or in combination with one or more of the first through sixteenth aspects, the overwriting of the stored QoE measurements is based at least in part on a result of comparing a service type priority of the stored QoE measurements and a service type priority of the QoE measurements.

In an eighteenth aspect, alone or in combination with one or more of the first through seventeenth aspects, the overwriting of the stored QoE measurements is based at least in part on a result of comparing a priority of a time duration or a location of the stored QoE measurements and a priority of a time duration or a location of the QoE measurements.

In a nineteenth aspect, alone or in combination with one or more of the first through eighteenth aspects, the overwriting of the stored QoE measurements is based at least in part on receiving an indication from a base station.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a base station, in accordance with the present disclosure. Example process 500 is an example where the base station (e.g., base station 110, base station 310) performs operations associated with using a timer for QoE measurements.

As shown in FIG. 5, in some aspects, process 500 may include transmitting, to a UE, timer configuration information for measuring a QoE using a timer (block 510). For example, the base station (e.g., using transmission component 704 depicted in FIG. 7) may transmit, to a UE, timer configuration information for measuring a QoE using a timer, as described above.

As further shown in FIG. 5, in some aspects, process 500 may include receiving QoE information indicating QoE measurements obtained by the UE before expiration of the timer (block 520). For example, the base station (e.g., using reception component 702 depicted in FIG. 7) may receive QoE information indicating QoE measurements obtained by the UE before expiration of the timer, as described above.

Process 500 may include additional aspects, such as any single aspect or any combination of aspects described below and/or in connection with one or more other processes described elsewhere herein.

In a first aspect, process 500 includes transmitting a QoE measurement pause command based at least in part on the QoE information.

In a second aspect, alone or in combination with the first aspect, process 500 includes transmitting updated timer configuration information based at least in part on the QoE information.

In a third aspect, alone or in combination with one or more of the first and second aspects, the timer runs in an application layer.

In a fourth aspect, alone or in combination with one or more of the first through third aspects, the timer runs in an AS layer.

In a fifth aspect, alone or in combination with one or more of the first through fourth aspects, the timer configuration information configures the timer per one or more of a service type, a QoE configuration, or a network slice.

In a sixth aspect, alone or in combination with one or more of the first through fifth aspects, the timer configuration information includes configuration information for one or more of a storage size, a time window, a storage size window, or a storage queue window.

In a seventh aspect, alone or in combination with one or more of the first through sixth aspects, the one or more of the storage size, the time window, the storage size window, or the storage queue window is configured per one or more of a service type, a QoE configuration, or a network slice.

In an eighth aspect, alone or in combination with one or more of the first through seventh aspects, the timer configuration information includes priority information for overwriting stored QoE measurements with QoE measurements based at least in part on comparing a priority of a time duration or a location of the stored QoE measurements and a priority of a time duration or a location of the QoE measurements.

In a ninth aspect, alone or in combination with one or more of the first through eighth aspects, the timer configuration information indicates whether to overwrite stored QoE measurements with QoE measurements.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
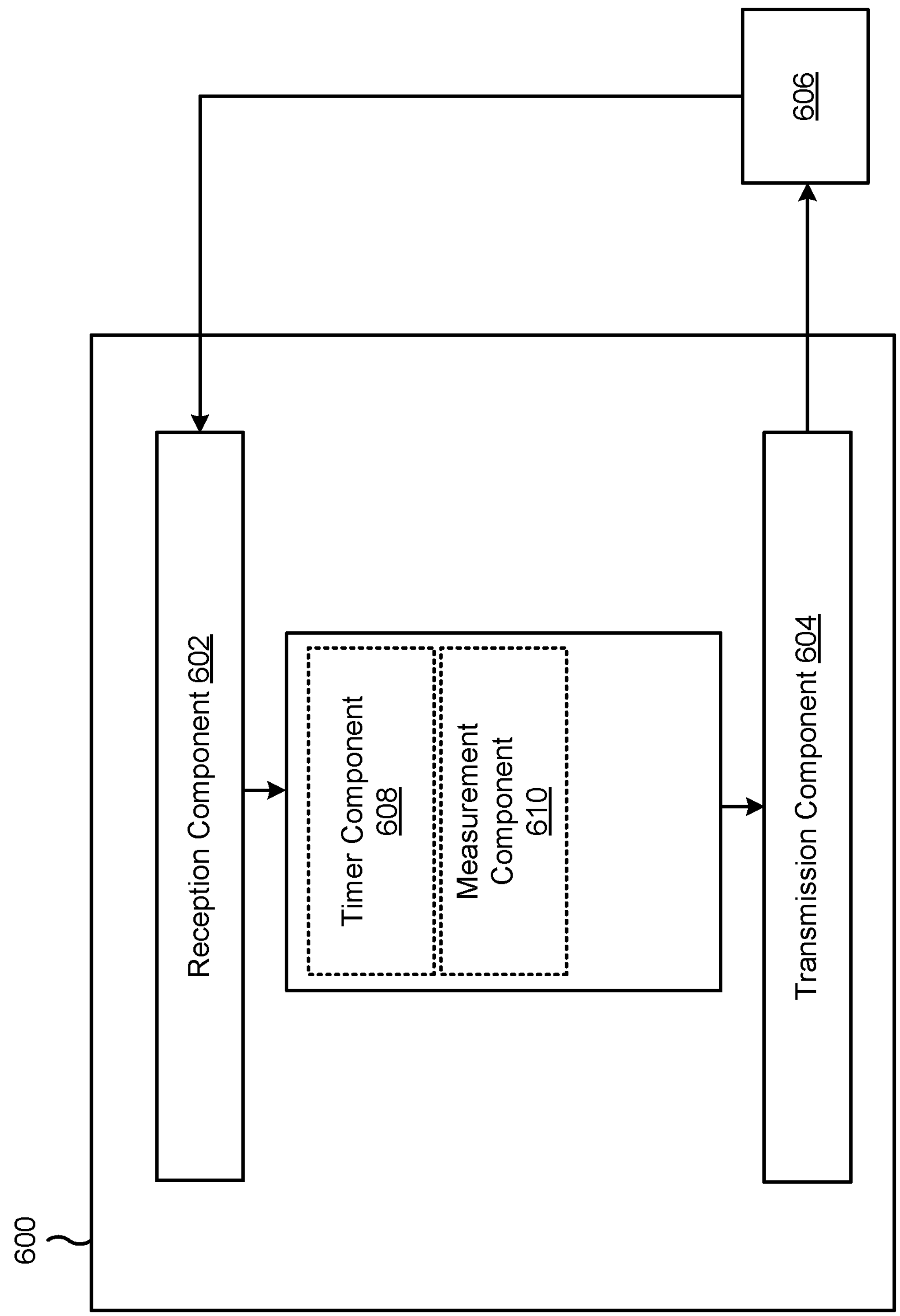
FIGS. 6-7 are block diagrams of example apparatuses for wireless communication, in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a timer component 608 and/or a measurement component 610, among other examples. The timer component 608 and/or the measurement component 610 may reside in the application layer and/or the AS layer of the apparatus 600.

In some aspects, the apparatus 600 may be configured to perform one or more operations described herein in connection with FIGS. 1-2 and 3A-3B. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The timer component 608 may start a timer for obtaining QoE measurements. The measurement component 610 may obtain the QoE measurements until the timer expires. The transmission component 604 may transmit information indicating the QoE measurements.

The reception component 602 may receive, from an AS layer, timer configuration information to configure the timer per one or more of a service type, a QoE configuration, or a network slice. The timer component 608 may provide, to an application layer, an indication to stop measurements or an indication that the timer expired. The reception component 602 may receive, from a base station, timer configuration information that is configured per one or more of a service type, a QoE configuration, or a network slice.

The measurement component 610 may release a QoE configuration after the timer expires. The measurement component 610 may release a QoE configuration after a separate release timer expires.

The measurement component 610 may store one or more QoE measurements of the QoE measurements that are obtained within a time window.

The measurement component 610 may discard any QoE measurements of the QoE measurements that are obtained outside the time window. The measurement component 610 may stop the obtaining if a storage size of QoE measurements satisfies a storage size threshold. The measurement component 610 may store one or more QoE measurements of the QoE measurements that are obtained within a storage size window or a storage queue window. The measurement component 610 may discard any QoE measurements of the QoE measurements that are obtained outside the storage size window or the storage queue window. The measurement component 610 may store one or more QoE measurements of the QoE measurements that are for one or more of a defined time duration or a defined location. The measurement component 610 may overwrite stored QoE measurements with the QoE measurements if a QoE measurement storage is full.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
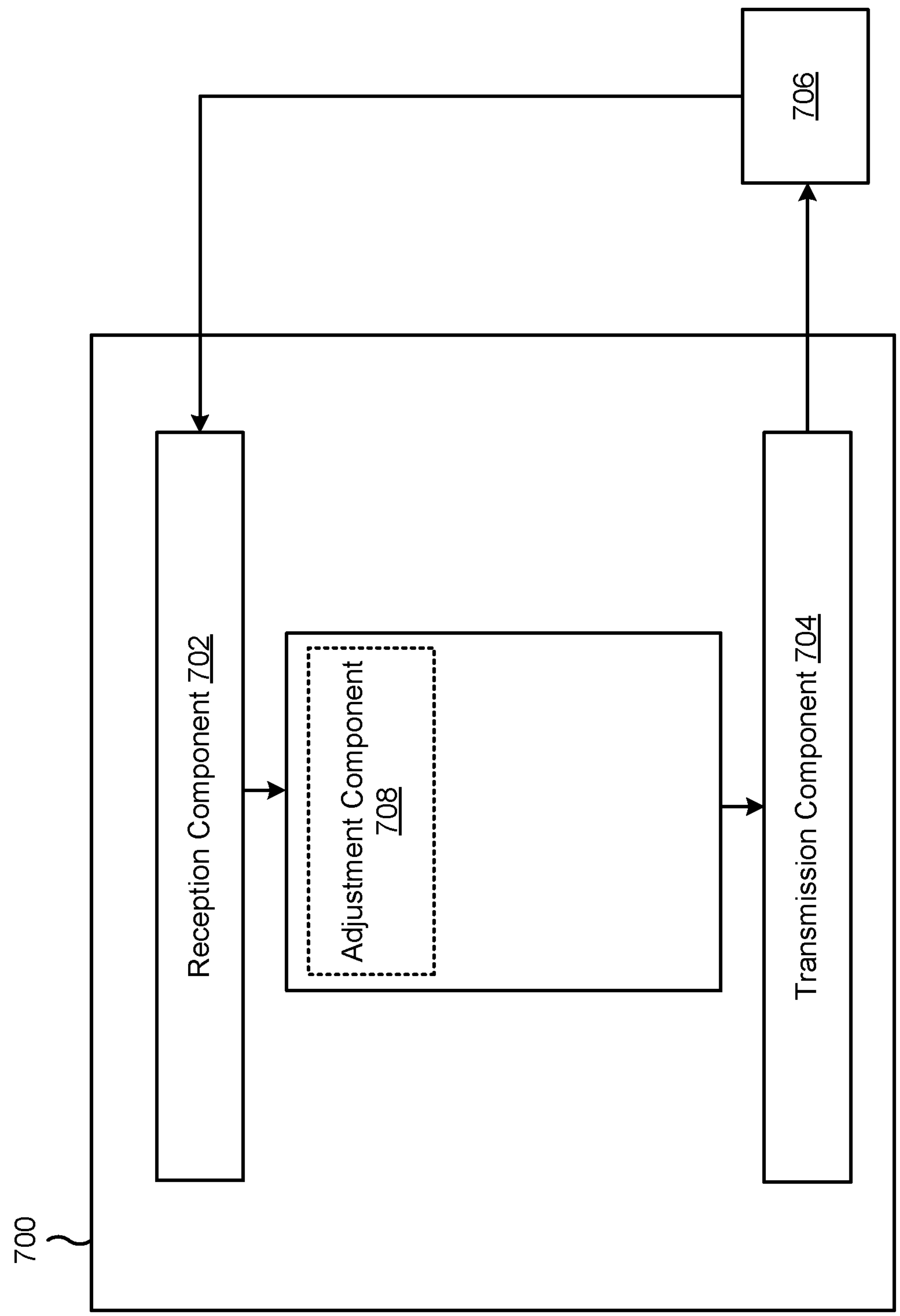

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include an adjustment component 708, among other examples.

In some aspects, the apparatus 700 may be configured to perform one or more operations described herein in connection with FIGS. 1-2 and 3A-3B. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit, to a UE, timer configuration information for measuring a QoE using a timer. The reception component 702 may receive QoE information indicating QoE measurements obtained by the UE before expiration of the timer. The adjustment component 708 may adjust a QoE configuration or service for an application based at least in part on the QoE measurements.

The transmission component 704 may transmit a QoE measurement pause command based at least in part on the QoE information. The transmission component 704 may transmit updated timer configuration information based at least in part on the QoE information.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: starting a timer for obtaining quality of experience (QoE) measurements; obtaining the QoE measurements until the timer expires; and transmitting information indicating the QoE measurements.

Aspect 2: The method of Aspect 1, wherein the timer runs in an application layer.

Aspect 3: The method of Aspect 2, wherein the timer is started based at least in part on the application layer receiving, from a lower layer, one or more of a pause indication, a transmission failure indication, a QoE configuration, a resume measurement indication, or a start measurement indication.

Aspect 4: The method of Aspect 3, further comprising receiving, from an access stratum layer, timer configuration information to configure the timer per one or more of a service type, a QoE configuration, or a network slice.

Aspect 5: The method of any of Aspects 1-4, wherein the timer runs in an access stratum (AS) layer.

Aspect 6: The method of Aspect 5, wherein the timer is started based at least in part on receiving a pause indication, a resume measurement indication, a start measurement indication, or a QoE configuration.

Aspect 7: The method of Aspect 5, wherein the timer is started based at least in part on a transmission failure at the AS layer or entering an idle or inactive state.

Aspect 8: The method of Aspect 5, further comprising providing, to an application layer, an indication to stop measurements or an indication that the timer expired.

Aspect 9: The method of Aspect 5, further comprising receiving, from a base station, timer configuration information that is configured per one or more of a service type, a QoE configuration, or a network slice.

Aspect 10: The method of any of Aspects 1-9, further comprising releasing a QoE configuration after the timer expires.

Aspect 11: The method of any of Aspects 1-9, further comprising releasing a QoE configuration after a separate release timer expires.

Aspect 12: The method of any of Aspects 1-11, further comprising: storing one or more QoE measurements of the QoE measurements that are obtained within a time window; and discarding any QoE measurements of the QoE measurements that are obtained outside the time window.

Aspect 13: The method of Aspect 12, wherein the time window is configured per one or more of a service type, a QoE configuration, or a network slice.

Aspect 14: The method of any of Aspects 1-13, further comprising stopping the obtaining if a storage size of QoE measurements satisfies a storage size threshold.

Aspect 15: The method of any of Aspects 1-14, further comprising: storing one or more QoE measurements of the QoE measurements that are obtained within a storage size window or a storage queue window; and discarding any QoE measurements of the QoE measurements that are obtained outside the storage size window or the storage queue window.

Aspect 16: The method of any of Aspects 1-15, further comprising storing one or more QoE measurements of the QoE measurements that are for one or more of a defined time duration or a defined location.

Aspect 17: The method of any of Aspects 1-16, further comprising overwriting stored QoE measurements with the QoE measurements if a QoE measurement storage is full.

Aspect 18: The method of Aspect 17, wherein the overwriting of the stored QoE measurements is based at least in part on a result of comparing a service type priority of the stored QoE measurements and a service type priority of the QoE measurements.

Aspect 19: The method of Aspect 17, where the overwriting of the stored QoE measurements is based at least in part on a result of comparing a priority of a time duration or a location of the stored QoE measurements and a priority of a time duration or a location of the QoE measurements.

Aspect 20: The method of Aspect 17, where the overwriting of the stored QoE measurements is based at least in part on receiving an indication from a base station.

Aspect 21: A method of wireless communication performed by a base station, comprising: transmitting, to a user equipment (UE), timer configuration information for measuring a quality of experience (QoE) using a timer; and receiving QoE information indicating QoE measurements obtained by the UE before expiration of the timer.

Aspect 22: The method of Aspect 21, further comprising transmitting a QoE measurement pause command based at least in part on the QoE information.

Aspect 23: The method of Aspect 21 or 22, further comprising transmitting updated timer configuration information based at least in part on the QoE information.

Aspect 24: The method of any of Aspects 21-23, wherein the timer runs in an application layer.

Aspect 25: The method of any of Aspects 21-24, wherein the timer runs in an access stratum layer.

Aspect 26: The method of any of Aspects 21-25, wherein the timer configuration information configures the timer per one or more of a service type, a QoE configuration, or a network slice.

Aspect 27: The method of any of Aspects 21-26, wherein the timer configuration information includes configuration information for one or more of a storage size, a time window, a storage size window, or a storage queue window.

Aspect 28: The method of Aspect 27, wherein the one or more of the storage size, the time window, the storage size window, or the storage queue window is configured per one or more of a service type, a QoE configuration, or a network slice.

Aspect 29: The method of any of Aspects 21-28, wherein the timer configuration information includes priority information for overwriting stored QoE measurements with QoE measurements based at least in part on comparing a priority of a time duration or a location of the stored QoE measurements and a priority of a time duration or a location of the QoE measurements.

Aspect 30: The method of any of Aspects 21-29, wherein the timer configuration information indicates whether to overwrite stored QoE measurements with QoE measurements.

Aspect 31: An apparatus for wireless communication at a device, comprising a processor; memory coupled with the processor; and instructions stored in the memory and executable by the processor to cause the apparatus to perform the method of one or more Aspects of Aspects 1-30.

Aspect 32: A device for wireless communication, comprising a memory and one or more processors coupled to the memory, the memory and the one or more processors configured to perform the method of one or more Aspects of Aspects 1-30.

Aspect 33: An apparatus for wireless communication, comprising at least one means for performing the method of one or more Aspects of Aspects 1-30.

Aspect 34: A non-transitory computer-readable medium storing code for wireless communication, the code comprising instructions executable by a processor to perform the method of one or more Aspects of Aspects 1-30.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-30.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

start a timer for obtaining quality of experience (QoE) measurements;

obtain the QoE measurements until the timer expires; and transmit information indicating the QoE measurements.

2. The UE of claim 1, wherein the timer runs in an application layer.

3. The UE of claim 2, wherein the timer is started based at least in part on the application layer receiving, from a lower layer, one or more of a pause indication, a transmission failure indication, a QoE configuration, a resume measurement indication, or a start measurement indication.

4. The UE of claim 3, wherein the one or more processors are configured to receive, from an access stratum layer, timer configuration information to configure the timer per one or more of a service type, a QoE configuration, or a network slice.

5. The UE of claim 1, wherein the timer runs in an access stratum (AS) layer.

6. The UE of claim 5, wherein the timer is started based at least in part on receiving a pause indication, a resume measurement indication, a start measurement indication, or a QoE configuration.

7. The UE of claim 5, wherein the timer is started based at least in part on a transmission failure at the AS layer or entering an idle or inactive state.

8. The UE of claim 5, wherein the one or more processors are configured to provide, to an application layer, an indication to stop measurements or an indication that the timer expired.

9. The UE of claim 5, wherein the one or more processors are configured to receive, from a base station, timer configuration information that is configured per one or more of a service type, a QoE configuration, or a network slice.

10. The UE of claim 1, wherein the one or more processors are configured to release a QoE configuration after the timer expires.

11. The UE of claim 1, wherein the one or more processors are configured to release a QoE configuration after a separate release timer expires.

12. The UE of claim 1, wherein the one or more processors are configured to:

store one or more QoE measurements of the QoE measurements that are obtained within a time window; and discard any QoE measurements of the QoE measurements that are obtained outside the time window.

13. The UE of claim 12, wherein the time window is configured per one or more of a service type, a QoE configuration, or a network slice.

14. The UE of claim 1, wherein the one or more processors are configured to stop the obtaining if a storage size of QoE measurements satisfies a storage size threshold.

15. The UE of claim 1, wherein the one or more processors are configured to:

store one or more QoE measurements of the QoE measurements that are obtained within a storage size window or a storage queue window; and discard any QoE measurements of the QoE measurements that are obtained outside the storage size window or the storage queue window.

16. The UE of claim 1, wherein the one or more processors are configured to store one or more QoE measurements of the QoE measurements that are for one or more of a defined time duration or a defined location.

17. The UE of claim 1, wherein the one or more processors are configured to overwrite stored QoE measurements with the QoE measurements if a QoE measurement storage is full.

18. The UE of claim 17, wherein the one or more processors are configured to overwrite the stored QoE measurements based at least in part on a result of comparing a service type priority of the stored QoE measurements and a service type priority of the QoE measurements.

19. The UE of claim 17, where the one or more processors are configured to overwrite the stored QoE measurements based at least in part on a result of comparing a priority of a time duration or a location of the stored QoE measurements and a priority of a time duration or a location of the QoE measurements.

20. The UE of claim 17, where the one or more processors are configured to overwrite the stored QoE measurements based at least in part on receiving an indication from a base station.

21. A base station for wireless communication, comprising:

a memory; and one or more processors, coupled to the memory, configured to:

transmit, to a user equipment (UE), timer configuration information for measuring a quality of experience (QoE) using a timer; and receive QoE information indicating QoE measurements obtained by the UE before expiration of the timer.

22. The base station of claim 21, wherein the one or more processors are configured to transmit a QoE measurement pause command based at least in part on the QoE information.

23. The base station of claim 21, wherein the one or more processors are configured to transmit updated timer configuration information based at least in part on the QoE information.

24. The base station of claim 21, wherein the timer runs in an application layer.

25. The base station of claim 21, wherein the timer runs in an access stratum layer.

26. The base station of claim 21, wherein the timer configuration information configures the timer per one or more of a service type, a QoE configuration, or a network slice.

27. The base station of claim 21, wherein the timer configuration information includes configuration information for one or more of a storage size, a time window, a storage size window, or a storage queue window.

28. The base station of claim 27, wherein the one or more of the storage size, the time window, the storage size window, or the storage queue window is configured per one or more of a service type, a QoE configuration, or a network slice.

29. The base station of claim 21, wherein the timer configuration information includes priority information for overwriting stored QoE measurements with QoE measurements based at least in part on comparing a priority of a time duration or a location of the stored QoE measurements and a priority of a time duration or a location of the QoE measurements.

30. The base station of claim 21, wherein the timer configuration information indicates whether to overwrite stored QoE measurements with QoE measurements.

31. A method of wireless communication performed by a user equipment (UE), comprising:

starting a timer for obtaining new quality of experience (QoE) measurements;

obtaining the new QoE measurements until the timer expires; and transmitting information indicating the new QoE measurements.

32. A method of wireless communication performed by a base station, comprising:

transmitting, to a user equipment (UE), timer configuration information for measuring a quality of experience (QoE) using a timer; and receiving QoE information indicating QoE measurements obtained by the UE before expiration of the timer.

* * * * *